United States Patent [19]
Macey

[11] Patent Number: 5,941,105
[45] Date of Patent: Aug. 24, 1999

[54] HUB LOCKING MECHANISM

[76] Inventor: Blair Macey, 251 Coral Springs Circle N.E., Calgary, Canada, T3J 3P7

[21] Appl. No.: 08/878,585

[22] Filed: Jun. 19, 1997

[51] Int. Cl.$^6$ ................................................. B60R 25/00
[52] U.S. Cl. ............................... 70/225; 70/259; 301/111
[58] Field of Search ............................. 70/225, 226, 259, 70/260, 158–173; 301/111, 121

[56] References Cited

U.S. PATENT DOCUMENTS

| | | | |
|---|---|---|---|
| 1,189,315 | 7/1916 | Van Ness | 70/226 |
| 1,219,789 | 3/1917 | Talbott et al. | 70/226 |
| 1,359,419 | 11/1920 | O'Brien | 70/226 |
| 1,361,756 | 12/1920 | Egbert | 70/226 |
| 1,365,949 | 1/1921 | Pichl | 70/226 |
| 1,426,666 | 8/1922 | Palmer | 70/259 |
| 1,434,156 | 10/1922 | Schnaars | 70/225 |
| 1,566,405 | 12/1925 | Jones | 70/226 |
| 1,901,613 | 3/1933 | Smith | 70/259 |
| 2,291,217 | 7/1942 | Hoecker. | |
| 4,628,714 | 12/1986 | Batteas et al. | 70/226 |
| 4,825,669 | 5/1989 | Herrera | 70/260 X |
| 5,408,854 | 4/1995 | Chiu | 70/225 |
| 5,716,107 | 2/1998 | Parker et al. | 301/111 |

FOREIGN PATENT DOCUMENTS

| | | | |
|---|---|---|---|
| 3101645 | 8/1982 | Germany | 70/225 |
| 8700098 | 8/1988 | Netherlands | 70/225 |
| 235172 | 11/1944 | Switzerland | 70/225 |

OTHER PUBLICATIONS

Chevrolet/GMC Manual, Axle Shaft: Removal & Installation (Author, Title and Date unknown).

*Primary Examiner*—Suzanne Dino Barrett
*Attorney, Agent, or Firm*—Thomas E. Malyszko

[57] ABSTRACT

A locking hub assembly has a hub rotatably engaged to a vehicle's non-rotating axle and a manually controlled actuator for selectively switching the hub assembly between an engaged position for rotatably fixing the hub to the axle and a disengaged position for freeing rotation of the hub on the axle. A locking mechanism for the hub assembly has a lock operatively engaged with the actuator and at least one throw arm. The lock is selectively operable between: a locked position in which the throw arm is extended into locking engagement with the hub to prevent operation of the actuator, and to prevent removal of the actuator from the hub as well as the hub from the axle; and, an unlocked position in which the throw arm is retracted from locking engagement to permit operation of the actuator.

19 Claims, 13 Drawing Sheets

HUB LOCKING MECHANISM

FIELD OF THE INVENTION

The present invention relates to wheel hub assemblies generally, and in particular to a mechanism for locking and unlocking rotation of the hub assembly of a vehicle's nonmotorized wheel to avoid theft, vandalism and the like of the vehicle.

BACKGROUND OF THE INVENTION

Conventional wheel hub assemblies on present day vehicles typically consist of a wheel (i.e. a tire mounted to a rim) bolted to a spindled hub which may be operatively engaged with a braking system and which may be operatively connected to the vehicle's drive train. Such conventional wheel hub assembly provides no security against theft of the wheel or the vehicle itself. On the other hand, vehicle security systems typically target the vehicle's doors and ignition assembly. However, once a door or ignition assembly is broken into, a thief can move the vehicle. Other security systems that activate loud warning signals during a vehicle break in do not mechanically impede a thief with removal of the vehicle.

A known wheel lock device for deterring theft or unauthorized movement of a vehicle is shown in U.S. Pat. No. 1,219,789 (Talbott et al.). This device suffers from several disadvantages, however. First, when in its locked position, it only prevents vehicle movement in one direction, namely forwardly, allowing the vehicle to be moved in reverse. Such uni-directional locking raises safety concerns where, for example, the vehicle is parked near a reverse incline on a road. Second, the device's key actuated lock is located out of an operator's reach at the back of the wheel assembly, rendering its use very awkward and difficult. To engage the lock, the operator has to lie on the ground and crawl under the vehicle to locate the key hole and insert the key. This is certainly not practical or acceptable with today's cars with low ground clearance and tight wheel wells. Third, since an activated device's locking pawl of a vehicle on a forward road gradient could get frictionally stuck to its adjacent ratchet wheel cog, a slight backward push or movement of the vehicle may be required to release the pawl from the cogs. Such pushing is impossible for one person alone since the key has to be turned while the vehicle is being moved. In any event, an unsafe situation is created since a sudden inadvertent lock release by an operator lying under a vehicle placed in neutral gear and on an incline could get run over by the suddenly freed vehicle.

Other prior art devices, such as those described in U.S. Pat. Nos. 1,566,405 (Jones), 2,291,217 (Hoecker) and 5,408,854 (Chiu), are directed to locking wheels onto hubs, and only prevent theft or removal of the wheel from its hub, but do not lock rotation of the hub.

What is therefore desired is a novel mechanism for locking rotation of a wheel hub assembly which overcomes the limitations and disadvantages of prior locking devices. Preferably, it should prevent vehicle movement in both forward and reverse directions. It should be easily accessible to a user and safe to use.

SUMMARY OF THE PRESENT INVENTION

In one aspect the invention provides a locking hub assembly for a vehicle's nonrotating axle comprising:

a hub housing rotatably mounted on said axle, and having an outside surface for receiving a wheel and an inside surface forming a cavity;

a sleeve element mated with an end portion of said axle located within said cavity;

a clutch ring rotatably fixed to said hub housing and slideably engaged with said inside surface for moving between an engaged position with said sleeve element wherein said hub housing is rotatably fixed to said axle, and a disengaged position with said sleeve element wherein said hub housing is free to rotate on said axle;

an actuating cam body adjacent said clutch ring adapted to move between an extended position for sliding said clutch ring to said disengaged position, and a retracted position for returning said clutch ring to said engaged position;

a biaser for urging said clutch ring from said disengaged position to said engaged position;

a manually controlled actuator operatively engaged with said actuating cam body for selecting between said extended and retracted positions;

a retaining member for holding said actuator within said hub housing; and, a locking mechanism for securing at least said actuator and retaining member within said hub housing to prevent their removal therefrom, and for selectively securing said clutch ring in said engaged and disengaged positions.

In another aspect the invention provides a hub assembly having a hub rotatably engaged to a non-rotating axle, said hub assembly having a manually controlled actuator for selectively switching said hub assembly between an engaged position for rotatably fixing the hub to said axle and a disengaged position for freeing rotation of the hub on said axle, a locking mechanism comprising a lock operatively engaged with said actuator and having at least one throw arm, said lock being selectively operable between a locked position in which said throw arm is extended into locking engagement with said hub to prevent operation of said actuator and to prevent removal of said actuator from said hub, and an unlocked position in which said throw arm is retracted from said locking engagement to permit operation of said actuator.

BRIEF DESCRIPTION OF THE DRAWING FIGURES

Embodiments of the invention will now be described, by way of example only, with reference to the accompanying drawings, wherein.

DESCRIPTION OF PREFERRED EMBODIMENT

Figure 1:
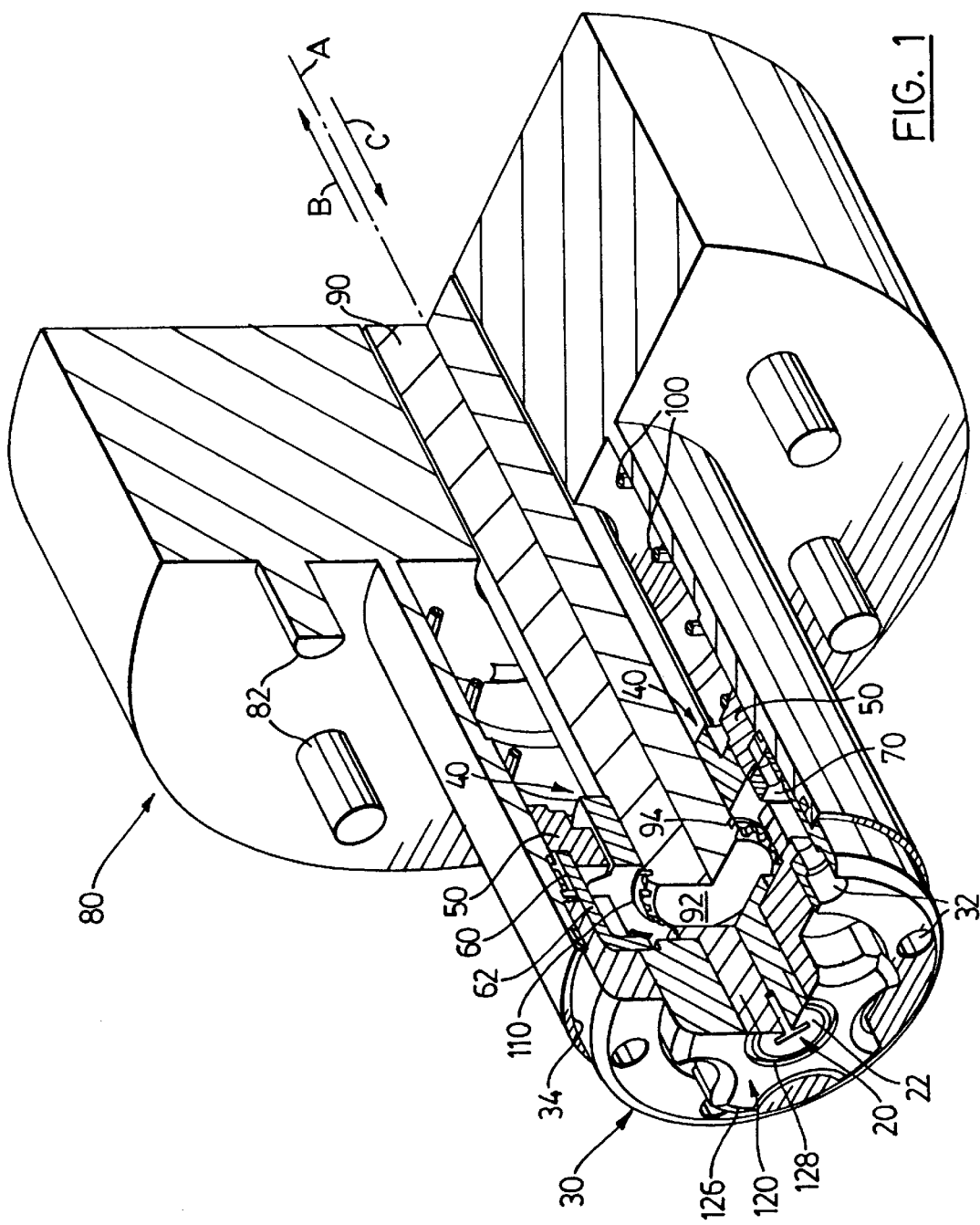
FIG. 1 is a broken away perspective view of a hub assembly and locking mechanism according to a first embodiment of the present invention.
Figure 2:
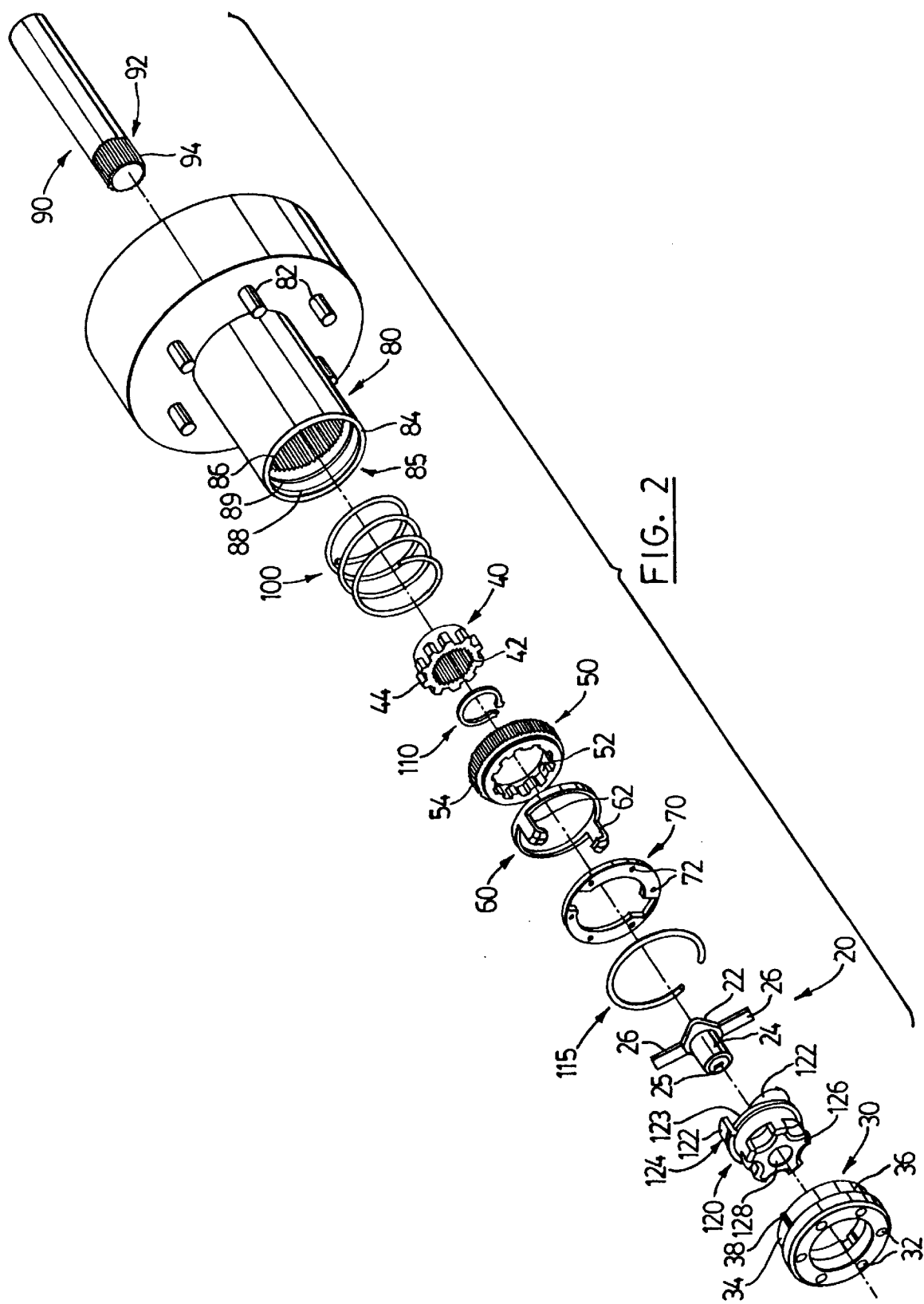
FIG. 2 is an exploded view of the hub assembly and locking mechanism of FIG. 1.

Reference is first made to FIGS. 1 & 2 which show a locking hub assembly with a key-controlled locking mechanism, generally designated by reference numeral 20, according to a preferred embodiment of the present invention. In particular, the locking hub assembly consists in part of a known hub assembly used with a driven axle of Chevrolet/GMC trucks modified to accommodate the locking mechanism 20 on a non-rotating axle. Hence, the present invention relates to the locking mechanism for the hub assembly, and to resultant modifications and improvements to the hub assembly required for operation of the key-controlled locking mechanism. It will be understood that the locking mechanism 20 of the present invention may be adapted for use with hub assemblies other than the one chosen for illustration herein.

The locking hub assembly includes the following components: a retaining cylinder 30; an axle shaft sleeve 40; a clutch ring 50; an actuating cam body 60; an outer clutch retaining ring 70; a rotatable hub housing 80 having an outside surface with a plurality of bolts 82 for receiving a wheel or tire rim (not shown); a non-rotating (i.e. stationary or fixed) axle shaft 90 defining a longitudinal centerline "A"; a spring 100; an axle shaft snap ring 110; an internal snap ring 115; and a finger-controlled actuator knob 120. The interaction of these various components is described in greater detail below, but in essence rotational locking and unlocking of the hub assembly occurs by engaging and disengaging the sleeve 40 with the clutch ring 50, respectively.

Figure 6:
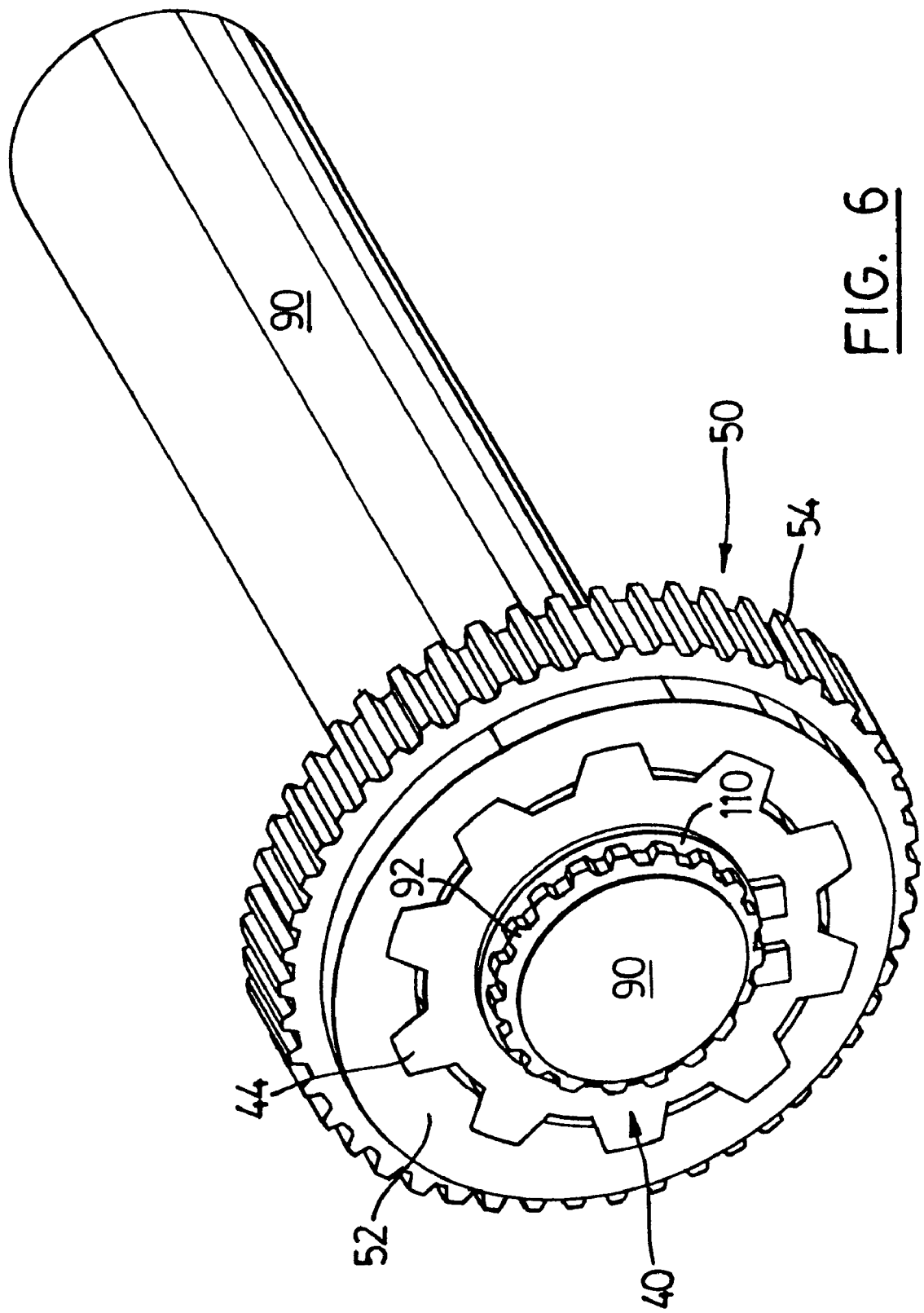
FIG. 6 is a perspective view of a clutch ring engaged with a shaft and shaft sleeve of the hub assembly.
Figure 7:
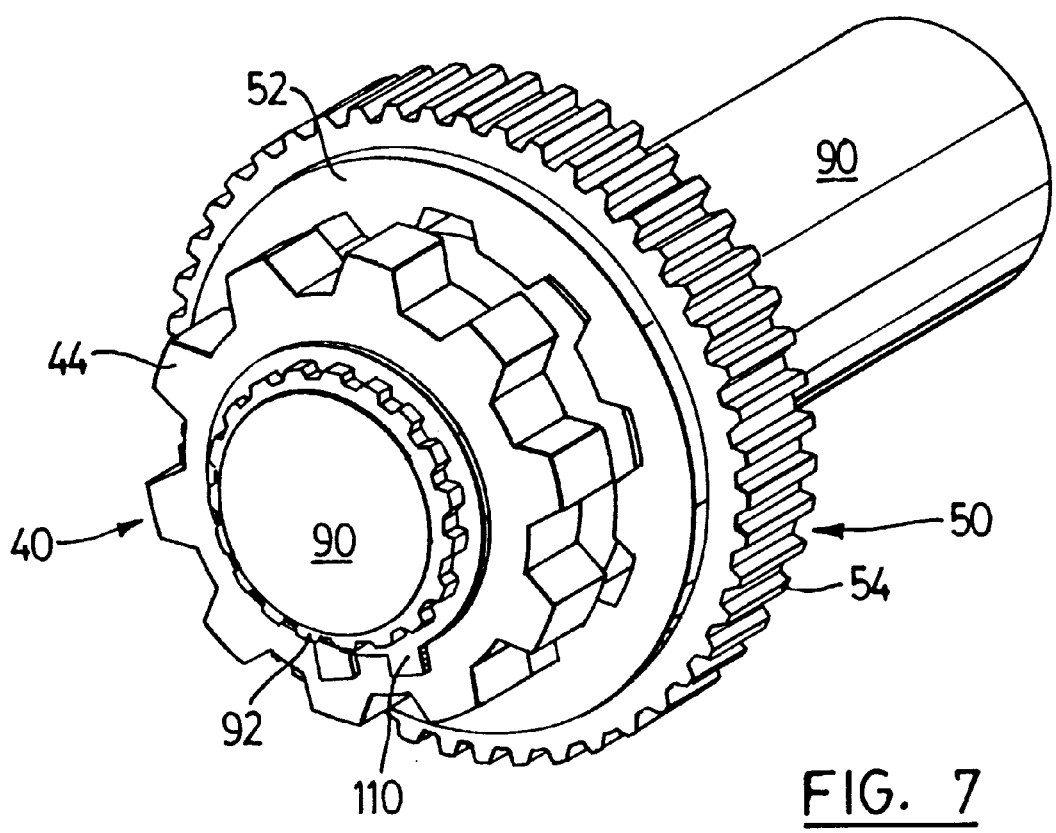
FIG. 7 is a view similar to FIG. 6 showing the clutch ring disengaged with the shaft and shaft sleeve.

The axle shaft sleeve 40 has a splined inner surface 42 which slides onto and mates with a splined end portion 92 of the shaft 90 to prevent rotation of the sleeve relative to the shaft. In an assembled hub assembly, the sleeve 40 remains engaged with the shaft 90 at all times, and therefore does not rotate with the hub housing 80. The sleeve 40 is held in place upon the shaft 90 by the axle shaft snap ring 110 which snaps into a circumferential groove 94 on the splined end portion 92. The axle shaft sleeve 40 also has an outer surface portion having outer clutch gears 44 extending thereabout for meshing with inner clutch gears 52 of clutch ring 50. FIG. 6 shows the inner clutch gears 52 of the clutch ring 50 engaged with the sleeve's outer clutch gears 44, in which mode torque may be transferred between the sleeve 40 and the clutch ring 50. Conversely, FIG. 7 shows the inner clutch gears 52 disengaged from the sleeve's outer clutch gears 44 to allow independent rotation of the clutch ring 50 relative to the sleeve 40, thus freeing rotation of the hub housing 80 relative to the shaft 90. The outer clutch gears 44 and the inner clutch gears 52 are each tapered in the longitudinal direction "A" to facilitate initial engagement of the gears and, as the gears slide past each other into full engagement, the tapered configuration provides a progressively tighter fit.

Figure 4:
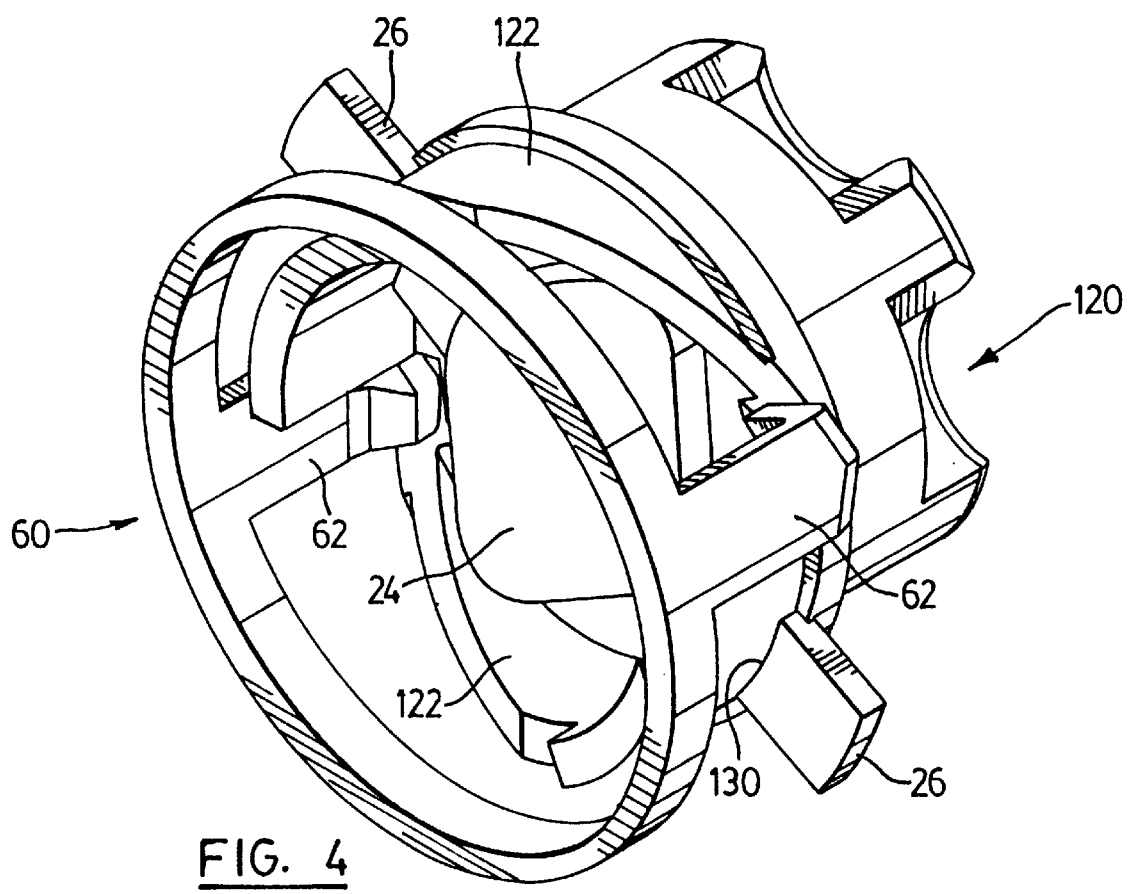
FIG. 4 is a perspective view of an actuator knob of the locking mechanism and an actuating cam body in a hub-rotation-locked position, and a key-controlled lock secured.
Figure 5:
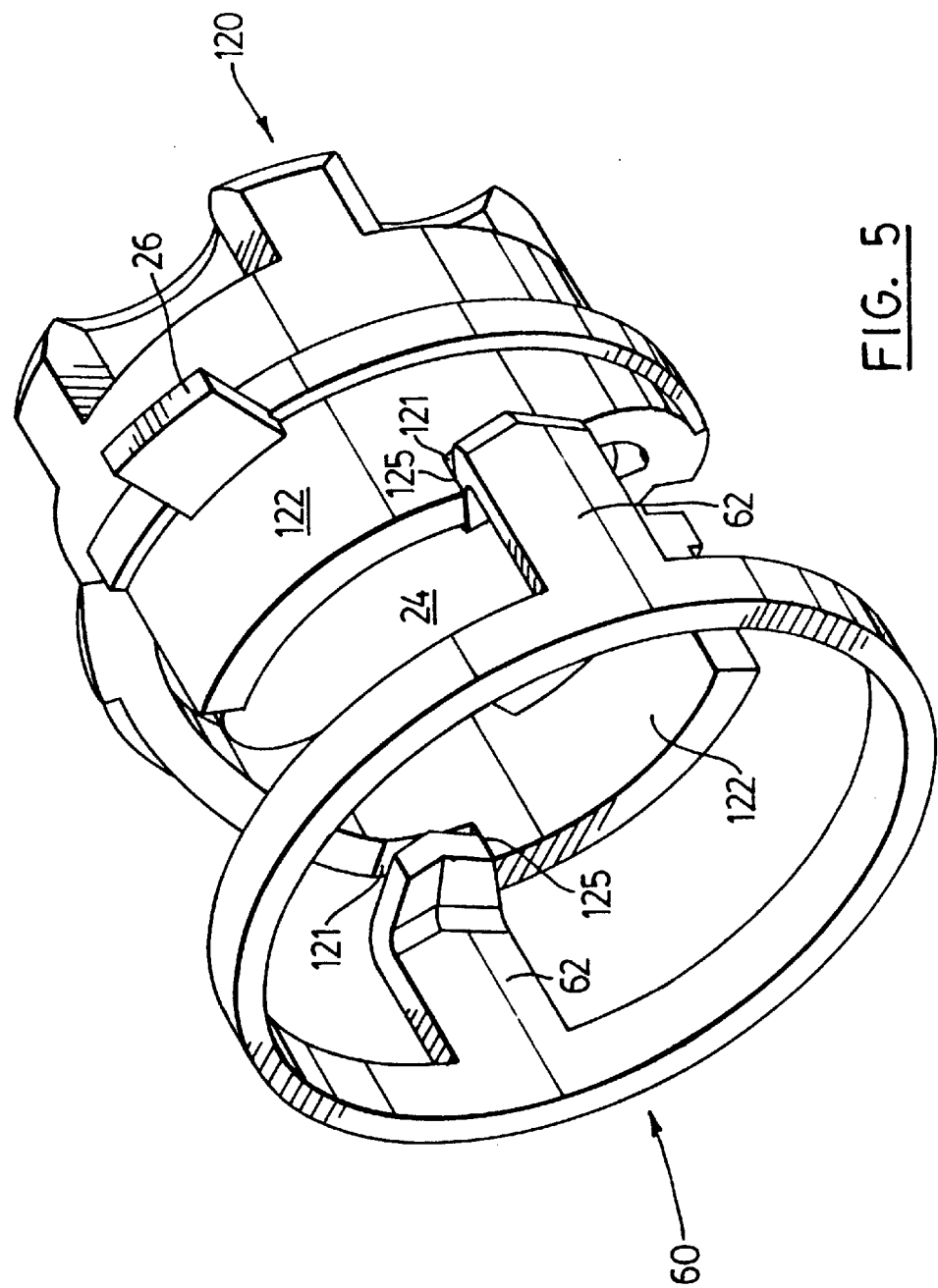
FIG. 5 is a view similar to FIG. 4 showing the actuator knob and actuating cam body in a hub-rotation-unlocked position, and the key-controlled lock secured.
Figure 8:
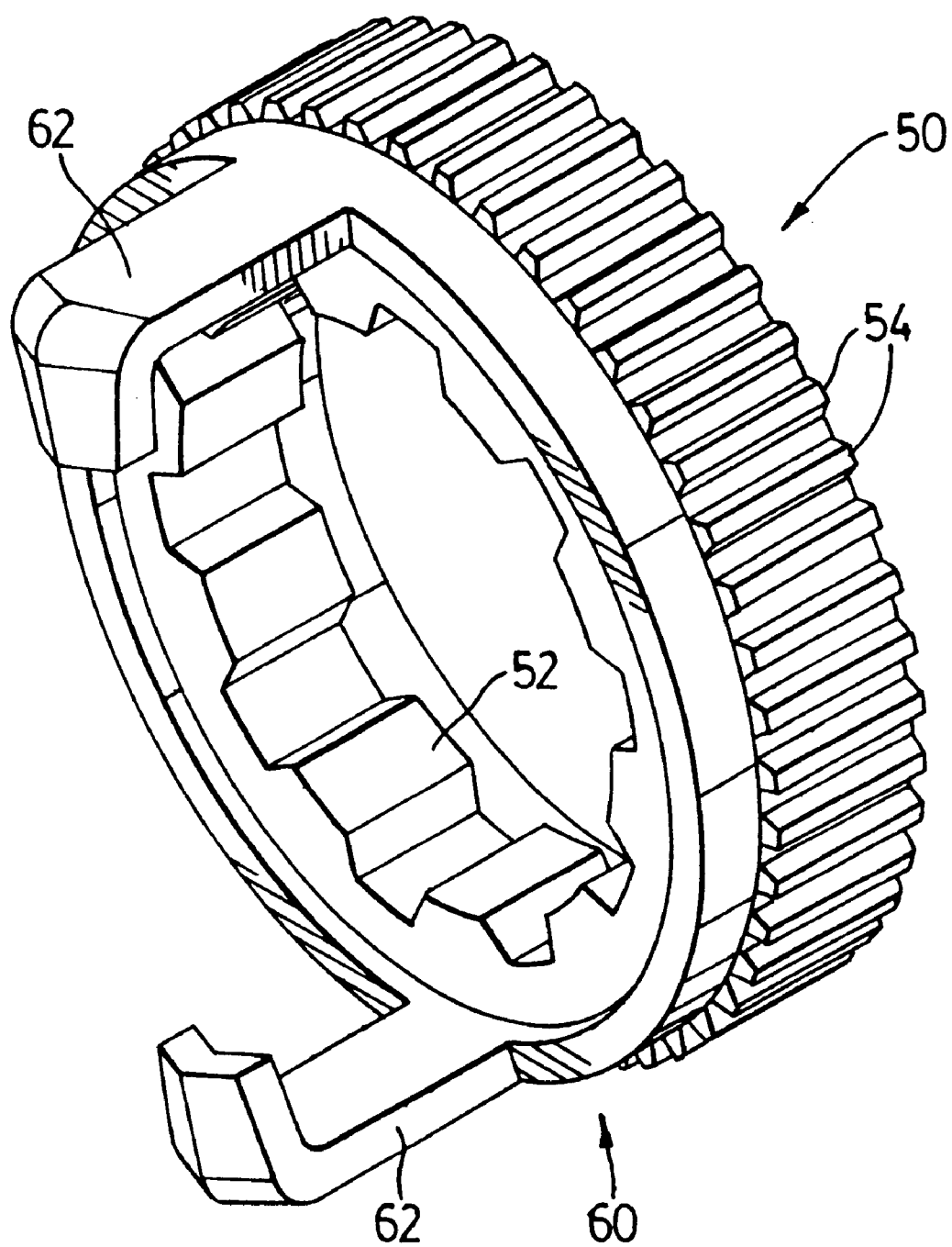
FIG. 8 is a perspective view of the actuating cam body interfacing with the clutch ring.

Referring now to FIG. 8 as well, the outer radial surface of the clutch ring 50 has raised teeth 54 which are machined to slidingly engage longitudinal grooves (not shown) on an inside surface (indicated by 85) of the hub housing 80. When assembled, the clutch ring 50 remains rotatably engaged with the hub housing at all times, but may slide along the hub's longitudinal grooves parallel to axis "A". Further, the clutch ring 50 is engaged and disengaged with the sleeve 40 by the longitudinal movement inwards and outwards (i.e. in the direction of arrow "B" (inwards) and "C" (outwards) shown in FIG. 1), respectively, of the actuating cam body 60 which abuts the clutch ring (see also FIG. 8). Such inward and outward movement is accomplished by turning the actuator knob 20 counterclockwise and clockwise, respectively. Referring also to FIGS. 4 & 5, the actuating cam body 60 has a pair of opposed arms 62, each of which rides on an inclined ramp 122 located on an inside face of the actuator knob 120. Hence, the ramps 122 and arms 62 convert rotation of the actuator knob 20 into longitudinal movement of the actuating cam body 60. In the preferred embodiment, a clockwise motion (as viewed in FIG. 1) of the knob 20 allows the cam body arms 62 to slide to the lower or bottom ends of the ramps 122 (as in FIG. 4), and so the actuating cam body 60 moves outwardly away from the shaft 90 and allows the clutch ring 50 to slide over and engage the sleeve 40. The actuating cam body 60 and the clutch ring 50 are both urged outwardly into the engaged position by the spring 100 which bears on the clutch ring 50. Conversely, a counterclockwise motion of the knob 20 forces the cam body arms 62 to slide to the upper or top ends of the ramps 122 (as in FIG. 5), thus moving the cam body 60 inwardly toward the shaft. As a result the clutch ring 50 is pushed off and disengages the sleeve 40.

The actuator knob 120 is retained or held to the housing 80 by sandwiching the knob 120 between the outer clutch retaining ring 70 and the retaining cylinder 30 in a manner that allows a user to twist the actuator knob 120 using finger grips 126. The present invention provides enlarged finger grips 126 which extend beyond the retaining cylinder 30 for ease of gripping and twisting the actuator knob 120. The internal snap ring 115 acts as stopper for the parts behind it, namely the ring 115 fits into a first or inside circumferential groove 89 inside the hub housing's cavity and retains the outer clutch retaining ring 70, the actuating cam body 60, the clutch ring 50, and the spring 100 within the housing 80. The ring 115 also serves to retain or keep from longitudinal motion the actuator knob 120 and the locking mechanism 20. The whole hub assembly is kept inside the hub housing 80 by retaining cylinder 30 which is affixed to the assembly via a plurality of bolts (not shown) inserted through circumferentially spaced bolt holes 32 and screwed into appropriately threaded bolt holes 72 in the outer clutch retaining ring 70. The retaining cylinder 30 has a circumferential ledge or stop 34 for bearing against an outside edge 84 of the hub housing 80 so that only a rear portion 36 of the retaining cylinder fits into the housing. According to the present invention, the rear portion 36 of the retaining cylinder is provided with a raised tooth 38 which mates with a notch 85 of corresponding shape extending inside the hub housing 86 from its outside edge 84 to properly align the retaining cylinder 30 with the housing 80 during installation, and to prevent rotation of the retaining cylinder and other components of the hub assembly within the housing.

Figure 9:
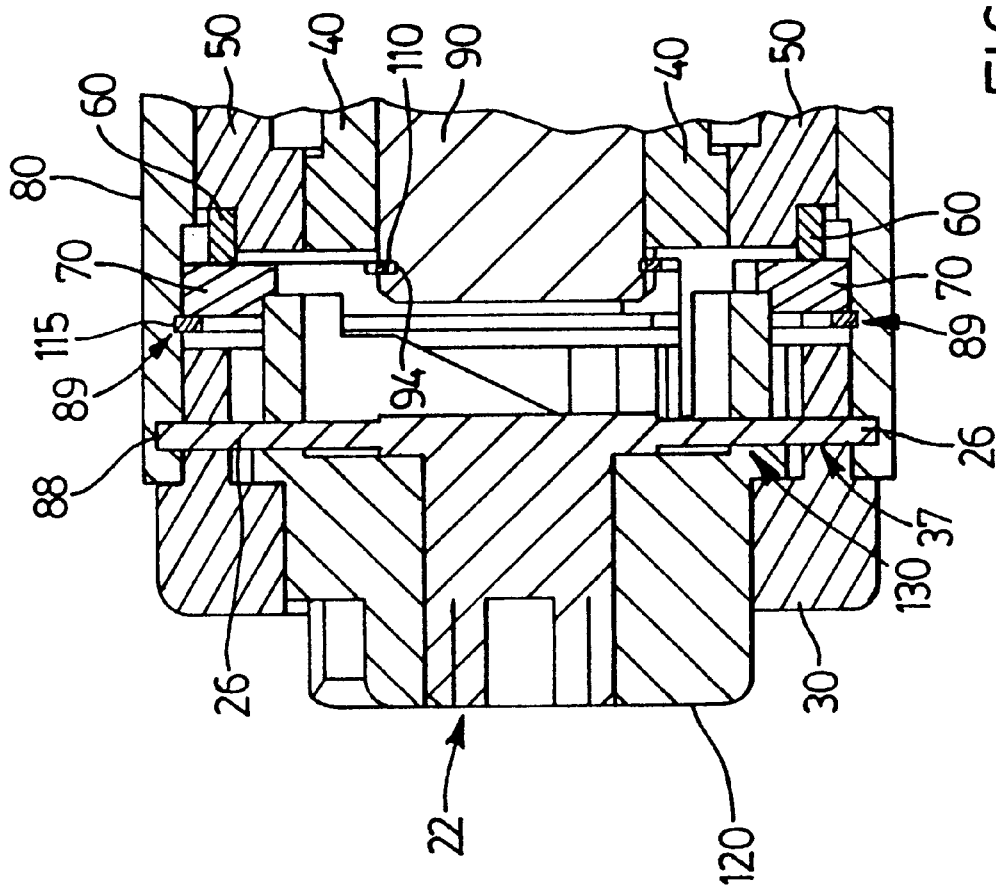
FIG. 9 is a cross-sectional view along line 9—9 of FIG. 1 showing the hub assembly and locking mechanism in locked positions.
Figure 10:
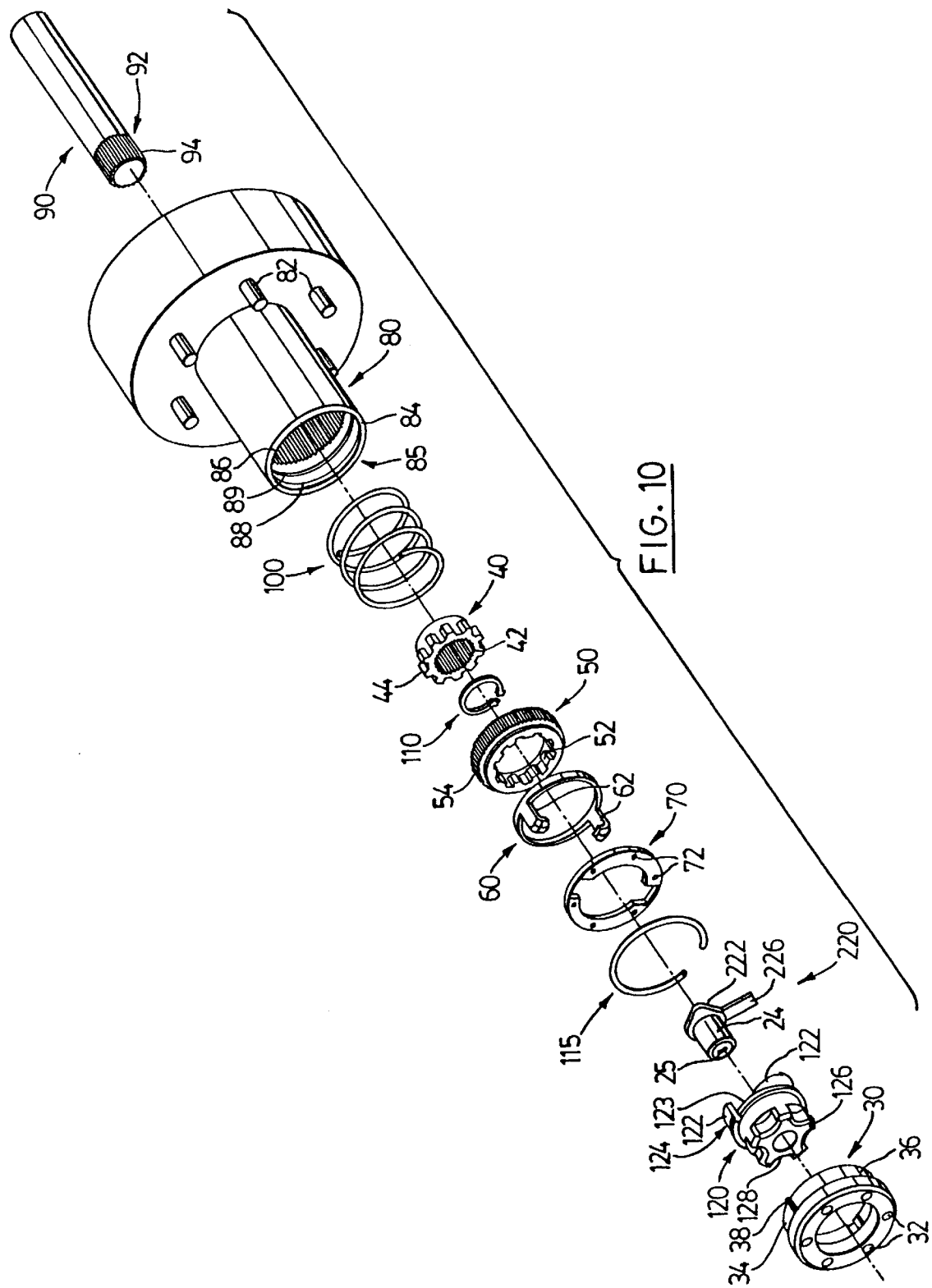
FIG. 10 is a view similar to FIG. 1 showing a second embodiment of the locking mechanism employing a key-controlled lock with a single throw arm.
Figure 11:
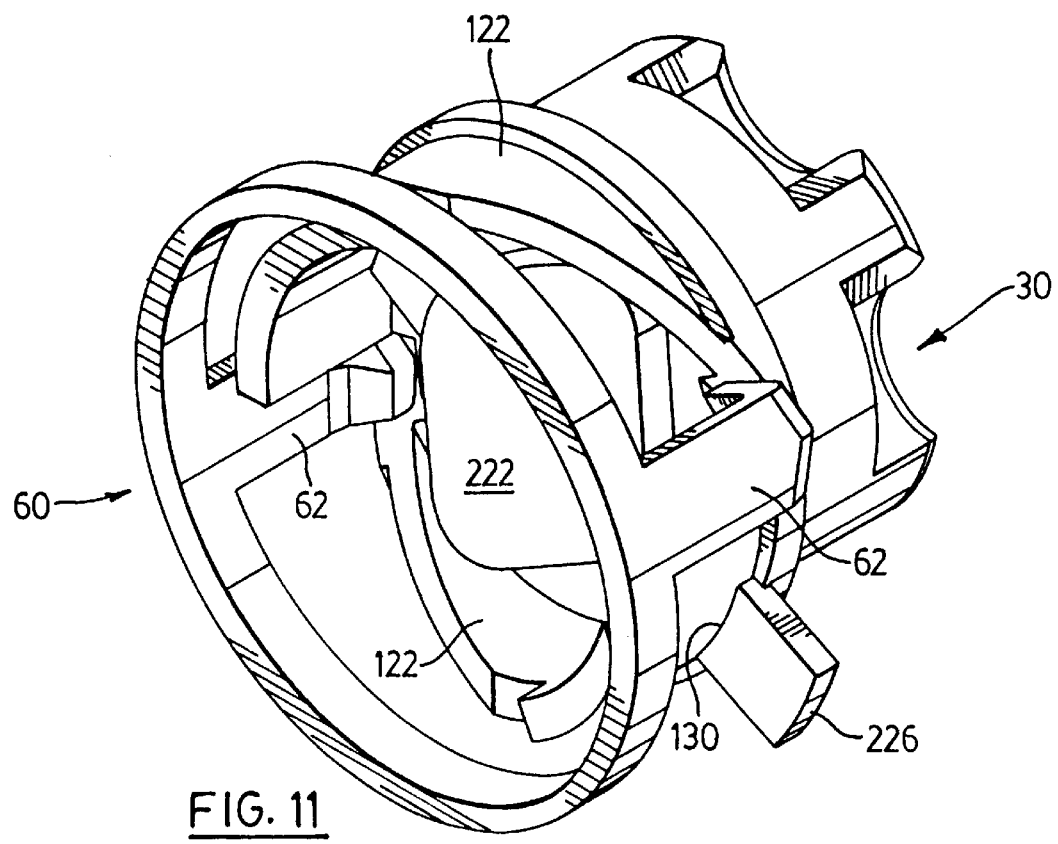
FIG. 11 is a perspective view of an actuator knob of the locking mechanism and an actuating cam body in a hub-rotation-locked position, and the key-controlled lock of the second embodiment secured.
Figure 12:
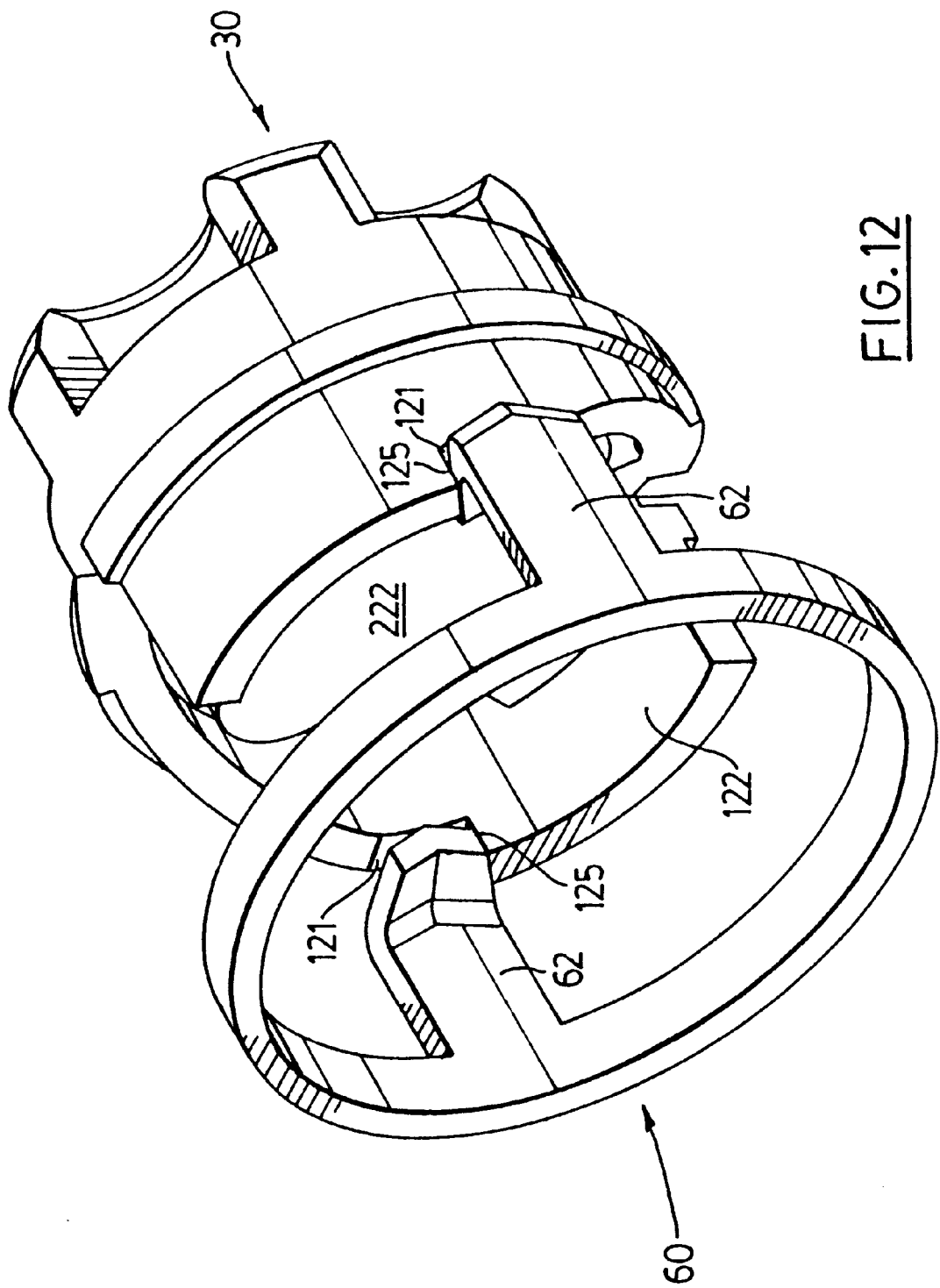
FIG. 12 is a view similar to FIG. 11 showing the actuator knob and actuating cam body in a hub-rotation-unlocked position, and the key-controlled lock secured; and, FIG. 13 is a view similar to FIG. 9 showing the locking mechanism of the second embodiment.
Figure 13:
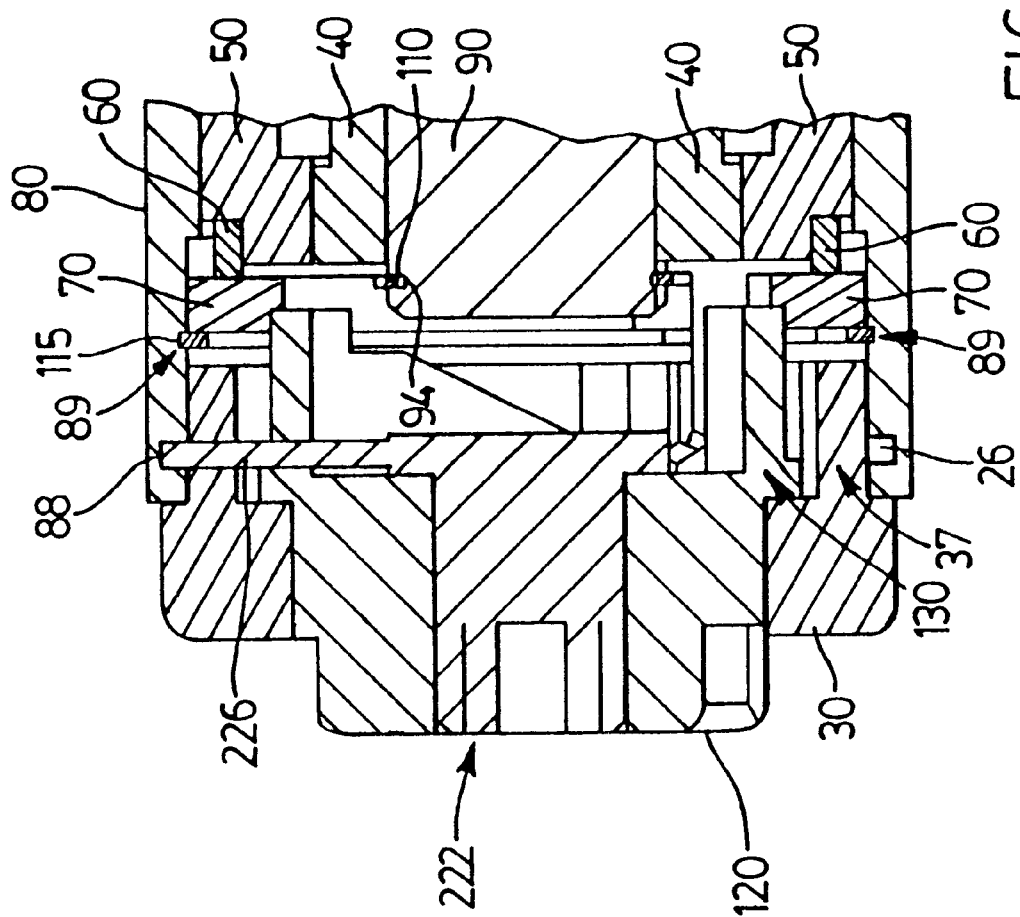

In essence, therefore, the hub assembly described above locks or unlocks rotation of the hub housing 80 on the shaft 90 when a user twists the actuator knob 120 clockwise or counterclockwise, respectively, so that the actuating cam body 60, and thus the clutch ring 50, slides outwardly or is pushed inwardly to achieve the above discussed engagement or disengagement of the clutch ring 50 with the sleeve 40. To prevent the clutch ring 50 from being engaged or disengaged, and to prevent unauthorized dismantling of the hub assembly upon removal or theft of the bolts from the retaining cylinder 30, the locking mechanism 20 of the present invention is provided, and will now be described in greater detail with reference to FIGS. 1, 2, 4, 5 and 9. The locking mechanism 20 includes a lock 22 having a key-controlled cylinder 24 which fits into a central opening 128 of the actuator knob 120 and is fixed thereto. A user must have unobstructed access to the cylinder's key-hole 25 when the hub assembly is installed. In the preferred embodiment of the locking mechanism, the lock 22 has two opposed throw arms 26 which are key-controlled for extension and retraction radially from the cylinder 24. When extended, each throw arm 26 passes through slots 130 in the actuator knob 120 and corresponding slots 37 in the rear portion 36 of the retaining cylinder 30 (as best seen in FIG. 9) so that the actuator knob 120 is in effect fixed to the retaining cylinder 30, preventing turning of the knob relative to the cylinder. The slots 37 must be located between the bolt holes 32 so as not to interfere with placement of the bolts therethrough. The extended throw arms 26 also extend past the retaining cylinder 30 and into an outside or second circumferential groove 88 formed on the inside surface 85 of the hub housing 80, just past its outside edge 84. The outside groove 88 is continuous in the preferred embodiment. When the throw arms 26 are engaged with the outside groove 88, the retaining cylinder 30, actuator knob 120 and lock 22 are secured within the housing 80 and can not be removed, even upon removal of the bolts from the retaining cylinder's bolt holes 32. The lock 22 has to be unlocked (i.e. the throw arms 26 must be retracted by using a key in the cylinder key hole 25) before the actuator knob 120 can be freed to rotate in either direction to change the hub lock position between the unlocked and locked positions.

Figure 3:
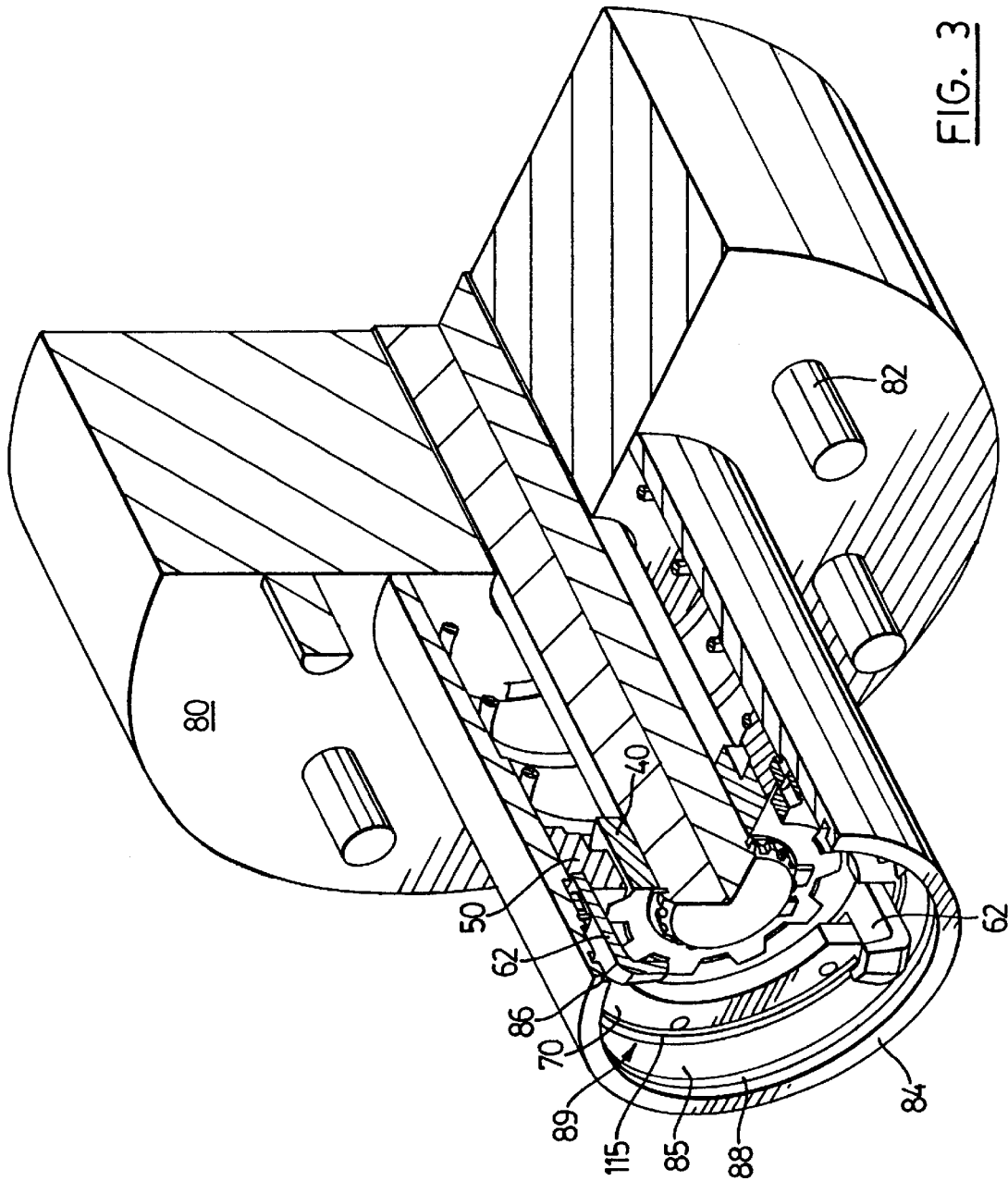
FIG. 3 is a view similar to FIG. 2 with a portion of the locking mechanism removed.

Referring again to FIG. 1, it shows the interaction of the components of the hub assembly in the locked position, namely with the arms 62 of the actuating cam body 60 resting at the bottom of the ramps 122 of the actuator knob 120, and the clutch ring 50 engaged with the sleeve 40 with the urging of the spring 100. FIG. 3 also illustrates this locked condition, but with the components in front of the outer clutch retaining ring 70 removed to more clearly show the actuating cam body arms 62 in their extended position. FIGS. 4 and 5 illustrate the interaction of the arms 62 with the bottoms and tops, respectively, of the actuator knob ramps 122. The top of each ramp 122 has a flat portion 121 on which the arms rest to avoid the natural tendency for the arms to slide to the bottom of the inclined ramps, and a stop 125 limits counterclockwise rotation of the actuator knob 120. Similarly, the knob's clockwise rotation is stopped when each arm 62 reaches the bottom of its respective ramp 122 and encounters the adjoining ramp. Also shown are the lock's extended throw arms 26 protruding through slots 130 in the body of the actuator knob 120.

Referring now to FIG. 9, the clutch ring 50 and the sleeve 40 are shown engaged or in the "locked" position, and the throw arms 26 of the lock 22 extended into the housing's inside groove 88 to prevent disengagement, or "unlocking", of the hub assembly. The same inside groove 88 accommodates the same extendible throw arms 26 when the hub assembly is placed in the disengaged or unlocked position. Hence, the throw arms will engage the same groove 88 when extended no matter how much the actuator knob 120 and lock 22 must travel between the locked and unlocked positions.

A second embodiment of the present invention is shown in FIGS. 10–13. The hub assembly of the second embodiment is in essence the same as that of the first embodiment described above, except that the lock 222 of the locking mechanism has only one extendible throw arm 226. This embodiment presents some possible advantages over the first embodiment in that the one-arm lock 222 may be less expensive to produce than the two-arm lock 22, and fewer slots 37 need to be machined in the retaining cylinder 30 since only one arm 226 must be accommodated. In the second embodiment it is important that the components of the hub assembly fit snugly into the housing since large tolerances may allow the arm 226 to be shimmied out of the groove 88 in the housing 80 by twisting and pulling on the actuator knob 120.

It may now be better appreciated how the locking hub assembly of the present invention operates. When it is desired to use a vehicle, a user frees rotation of the wheel which is bolted to the locking hub assembly by first inserting a key into the key hole 25 to release the lock 22, namely to retract the throw arms 26 and disengage them from the housing 80 and the retaining cylinder 30. The actuator knob 120 is then twisted a preset amount in a counterclockwise direction so that the arms 62 of the actuating cam body 60 ride up the ramps 122 and come to rest at the stops 125, thereby pushing the clutch ring 50 rearwardly against the spring 100 out of engagement with the sleeve 40 into the unlocked hub rotating position. The key is then used again to extend the throw arms 26 through the retaining cylinder 30 and into engagement with the housing 80 to secure the hub in its unlocked position. The vehicle may now be moved or driven since the wheel is free to rotate on the shaft 90. It will now be apparent that the locking mechanism of the present invention presents a safety feature, namely it prevents the hub assembly from reverting to a locked position during operation of the vehicle.

When use of the vehicle is no longer needed, rotation of the wheel may be locked by reversing the unlocking procedure described above. First the key is used to release the lock 22, and the actuator knob 120 is rotated clockwise so that the spring 100 urges or pushes the arms 62 of the actuating cam body 60 to the bottom of the ramps 122 and pushes the clutch ring 50 into engagement over the sleeve 40 into the locked position. The throw arms 26 are then extended to secure the hub assembly in the locked position, and the key is removed. The vehicle is therefore immobilized. Should someone attempt to gain unauthorized entry into the hub housing by removing the bolts of the retaining knob's bolt holes 32, the extended throw arms 26 will impede or prevent removal of the retaining knob 30 (and the other hub assembly components) from the hub housing.

It is noted that when the actuator knob 120 is being twisted clockwise to move the clutch ring 50 from the unlocked to locked positions, the clutch ring might not actually slide onto the sleeve 40 at that moment if the clutch ring's inner clutch gears 52 are not aligned with the sleeve's outer clutch gears 44 (although the above discussed tapers on the gears 44 & 52 reduce such occurrences). Such engagement is not immediately necessary since any small movement of the wheel (no more than several inches depending on tire size) after removal of the key from the lock 22 will align the gears 44 and 52 and allow the compressed spring 100 to urge the ring 50 onto the sleeve 40 to complete engagement of the gears.

To reduce the risk of a driver trying to drive the vehicle before unlocking the hub assembly, an electronic position sensor (not shown) may be installed within the hub assembly and connected to a indicator light within the vehicle, preferably on the dashboard, to energize a "Wheel Lock ON" warning lamp.

The hub locking mechanism of the present invention provides a self-locking feature in that the spring 100 automatically urges the clutch ring 50 into the locked position in the event of theft, vandalism or other unwanted removal of the exterior components of the hub assembly, such as the retaining cylinder 30, actuator knob 120 and lock 22 (as shown in FIG. 3, for example). In such an event, a thief would require additional time and special tools to dismantle the hub assembly and disengage the clutch ring 50 before rendering the wheel mobile to drive the vehicle away.

It is noted that the present hub locking mechanism is directed to stationary shaft wheel designs and not to motorized wheel assemblies with a rotative or driven axle shaft such as those found on all wheels of a four-wheel-drive vehicle, for instance. Rather, the hub locking mechanism is suitable for use on the front wheels of a rear wheel drive vehicle, for example. It will be apparent to those skilled in the art that the present mechanism may be used with many types of vehicles, such as automobiles, trucks, trailers and motorcycles.

The hub locking mechanism is preferably factory installed due to its complexity, but it may also be retrofitted with substantial modifications to a vehicle's existing hub assembly.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For example, the number and size of gears on the clutch ring and the sleeve may be varied to alter alignment angles. The number of throw arms on the lock may be increased above the two described for additional strength and security. The number of bolt holes for attaching the retaining knob to the housing may also be varied to alter strength and to accommodate the throw arms of the lock. The number of finger grips on the actuator knob may also be varied to alter grip and visual appeal.

I claim:

1. In a hub assembly having a hub rotatably engaged to a non-rotating axle, said hub assembly having a manually controlled actuator for selectively switching said hub assembly between an engaged position for rotatably fixing the hub to said axle and a disengaged position for freeing rotation of the hub on said axle, a locking mechanism comprising a lock with at least one throw arm operatively engaged with said actuator, said lock being selectively operable between a locked position in which said throw arm is radially extended into locking engagement with said hub to prevent operation of said actuator and to prevent removal of said actuator from said hub, and an unlocked position in which said throw arm is retracted from said locking engagement to permit operation of said actuator.

2. The assembly of claim 1 wherein said lock comprises a key-controlled cylinder for controlling extension and retraction of said throw arm.

3. The assembly of claim 2 wherein said actuator includes an opening for housing said cylinder of the lock, and a slot for slideably receiving said throw arm to fix said actuator to said lock in said locked position.

4. The assembly of claim 3 wherein said actuator includes a plurality of elongate finger grips located about said cylinder of said lock to facilitate gripping and twisting of said actuator.

5. A locking hub assembly for a vehicle's non-rotating axle comprising:
   a hub housing rotatably mounted on said axle, and having an outside surface for receiving a wheel and an inside surface forming a cavity;
   a sleeve element mated with an end portion of said axle located within said cavity;
   a clutch ring rotatably fixed to said hub housing and slideably engaged with said inside surface for moving between an engaged position with said sleeve element wherein said hub housing is rotatably fixed to said axle, and a disengaged position with said sleeve element wherein said hub housing is free to rotate on said axle;
   an actuating cam body adjacent said clutch ring adapted to move between a extended position for sliding said clutch ring to said disengaged position, and a retracted position for returning said clutch ring to said engaged position;
   a biaser for urging said clutch ring from said disengaged position to said engaged position;
   a manually controlled actuator adapted to be grasped and manipulated by a user, said actuator being operatively engaged with said actuating cam body for selecting between said extended and retracted positions;
   a retaining member for holding said actuator within said hub housing; and,
   a locking mechanism comprising a lock having a key-controlled cylinder and at least one radially extendible throw arm for engaging and securing at least said actuator and retaining member within said hub housing to prevent their removal therefrom, and for selectively securing said clutch ring in said engaged and disengaged positions.

6. The assembly of claim 5 wherein said inside surface of the hub housing includes a circumferential groove extending substantially thereabout, and wherein said throw arm extends into said groove when said lock is set to a locked position and said throw arm is retracted from said groove when said lock is set to an unlocked position.

7. The assembly of claim 5 wherein said actuator houses said cylinder of the lock and includes a slot extending radially therethrough for passing said throw arm.

8. The assembly of claim 7 wherein said retaining member fits about said actuator and has a plurality of slits adapted to receive said throw arm for preventing rotation of said actuator relative to said retaining member when said throw arm is extended through said slot and one of said slits.

9. The assembly of claim 8 wherein said retaining member has a plurality of longitudinal holes for receiving fasteners to fasten said retaining member to said hub housing, and said slits are located between said holes.

10. The assembly of claim 5 wherein an outer surface of said retaining member includes a radially raised tooth for mating with a notch on said inside surface of the hub housing to align said retaining member with said hub housing during installation and to prevent rotation of said retaining member relative to said hub housing.

11. The assembly of claim 5 wherein said actuator includes a plurality of elongate finger grips which extend through said retaining member and beyond an outer face of said retaining member to facilitate gripping and twisting of said actuator by a user.

12. The assembly of claim 5 further including an indicator located within said vehicle and operatively connected to said hub housing to indicate to an operator of said vehicle when said clutch ring is in said engaged position.

13. The assembly of claim 5 wherein said inside surface of the hub housing includes a circumferential groove extending substantially thereabout, and wherein said lock is selectively operable between a locked position in which said throw arm extends into said groove for said securing of the locking mechanism, and an unlocked position in which said throw arm is retracted from said groove to permit operation of said actuator to move said actuating cam body between said extended and retracted positions to selectively disengage and engage said clutch ring.

14. The assembly of claim 13 wherein said actuator is provided with a central opening for housing said cylinder of the lock, and a slot for passing said throw arm radially therethrough toward said groove.

15. The assembly of claim 14 wherein said retaining member fits over said actuator and has a plurality of slits adapted to receive said throw arm for preventing rotation of said actuator relative to said retaining member when said throw arm is extended through said slot and one of said slits.

16. The assembly of claim 15 wherein said retaining member has a plurality of longitudinal holes for receiving fasteners to fasten said retaining member to said hub housing, and said slits are located between said holes.

17. The assembly of claim 15 wherein an outer surface of said retaining member includes a radially raised tooth for mating with a notch on said inside surface of the hub housing to align said retaining member with said hub housing during installation and to prevent rotation of said retaining member relative to said hub housing.

18. The assembly of claim 17 wherein said actuator includes a plurality of elongate finger grips located about said cylinder of said lock and extending through said retaining member to facilitate gripping and twisting of said actuator by a user.

19. The assembly of claim 18 further including an indicator located within said vehicle and operatively connected to said hub housing to indicate to an operator of said vehicle when said clutch ring is in said engaged position.

* * * * *